(12) United States Patent
Cioraca et al.

(10) Patent No.: US 9,785,173 B2
(45) Date of Patent: Oct. 10, 2017

(54) WIRELESS COMMUNICATION SYSTEMS AND METHODS FOR INTELLIGENT ELECTRONIC DEVICES

(71) Applicant: General Electric Company, Schenectady, NY (US)

(72) Inventors: Anca Lucia Cioraca, Toronto (CA); Daniel Thanos, Stouffville (CA); Evgeny Pronin, Richmond Hill (CA); Michael Shane Pilon, Markham (CA)

(73) Assignee: General Electric Company, Schenectady, NY (US)

( * ) Notice: Subject to any disclaimer, the term of this patent is extended or adjusted under 35 U.S.C. 154(b) by 1237 days.

(21) Appl. No.: 13/836,962

(22) Filed: Mar. 15, 2013

(65) Prior Publication Data

US 2014/0277801 A1    Sep. 18, 2014

(51) Int. Cl.
*G05F 1/70* (2006.01)
*H04W 12/06* (2009.01)
*H04L 29/08* (2006.01)

(52) U.S. Cl.
CPC .............. *G05F 1/70* (2013.01); *H04L 67/125* (2013.01); *H04W 12/06* (2013.01); *Y02P 90/18* (2015.11); *Y02P 90/185* (2015.11); *Y04S 40/24* (2013.01)

(58) Field of Classification Search
None
See application file for complete search history.

(56) References Cited

U.S. PATENT DOCUMENTS

| 6,985,087 B2 | 1/2006 | Soliman |
| 7,587,481 B1 | 9/2009 | Osburn, III |
| 2005/0288877 A1* | 12/2005 | Doig .................. G01R 21/133 702/60 |
| 2008/0162930 A1* | 7/2008 | Finney ................. H04L 63/083 713/165 |

FOREIGN PATENT DOCUMENTS

| EP | 0477371 A1 | 4/1992 |
| EP | 1801942 A2 | 6/2007 |
| EP | 1936768 A1 | 6/2008 |

OTHER PUBLICATIONS

European Search Report and Written Opinion issued in connection with corresponding EP Application No. 14160108.08-1870 on Jul. 23, 2014.
Spehro Pefhany, "Modbus Protocol", Jan. 11, 2000. XP055106685, Retrieved from the Internet: URL:http://irtfweb.ifa.hawaii.edu/~smokey2/software/about/sixnet/modbus/modbusproto_col.pdf [retrieved on Mar. 11, 2014].

(Continued)

*Primary Examiner* — Ryan Jarrett
(74) *Attorney, Agent, or Firm* — Parks IP Law LLC

(57) ABSTRACT

The embodiments described herein provide a system including an intelligent electronic device (IED) comprising a first processor configured to communicate control commands to power equipment, receive measurements from the power equipment, use a secure wireless system to send data to an access point, wherein the data includes the measurements, and use the secure system to communicate with a management device, via the access point, to receive configuration information, command information, or any combination thereof.

14 Claims, 11 Drawing Sheets

(56) References Cited

OTHER PUBLICATIONS

"iRecv Wireless gateway/data concentrator/RTU", pp. 1-2, May 22, 2012. May 22, 2012 (May 22, 2012), pp. 1-2, XP055128982, Retrieved from the Internet: URL:http://literature.rockwellautomation.c om/idc/groups/literature/documents/pp/ssb-ppO19_-en-p.pdf [retrieved on Jul. 15, 2014].

* cited by examiner

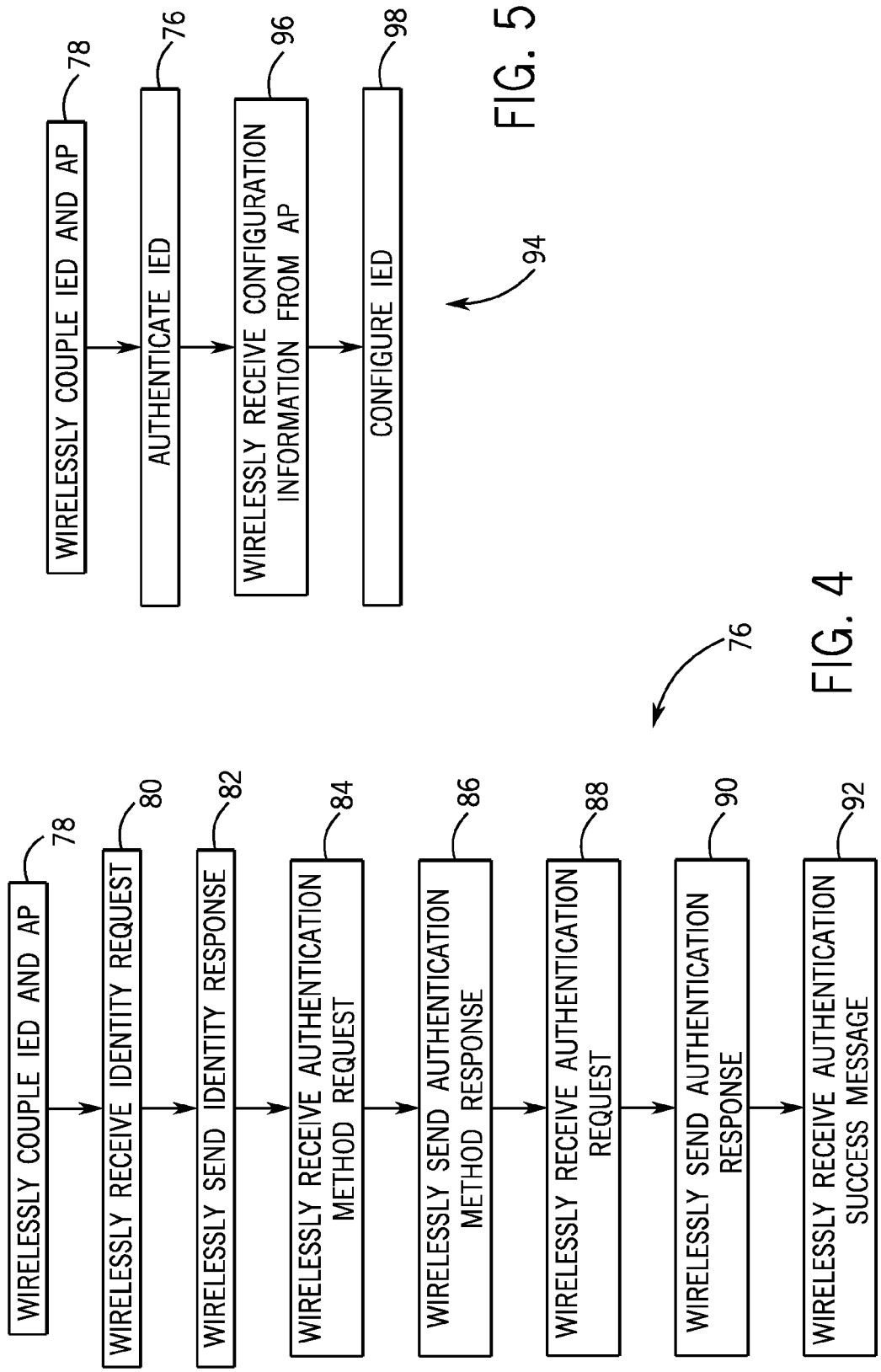

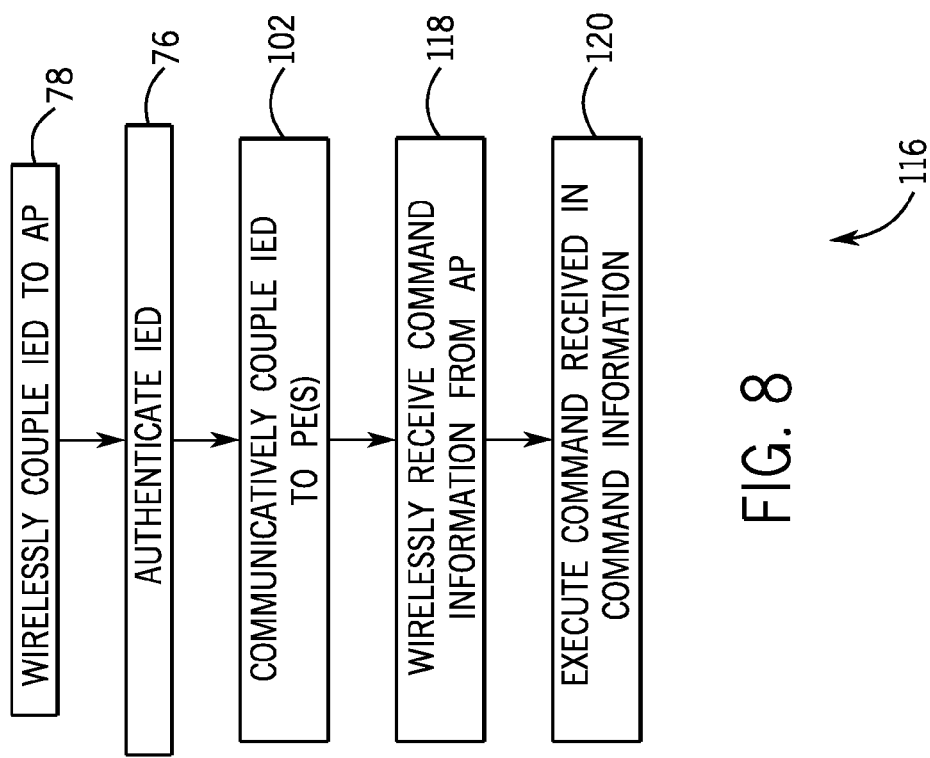

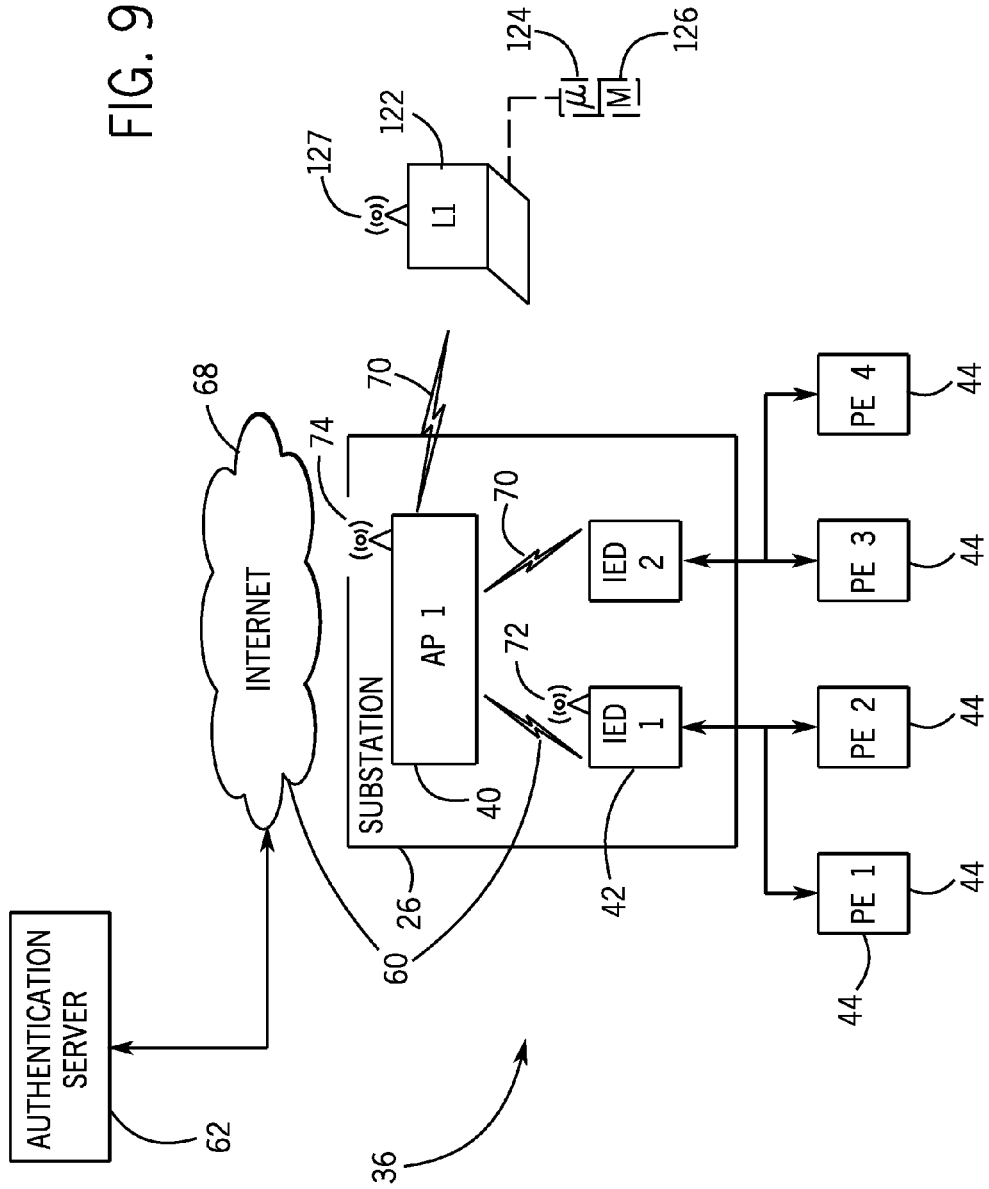

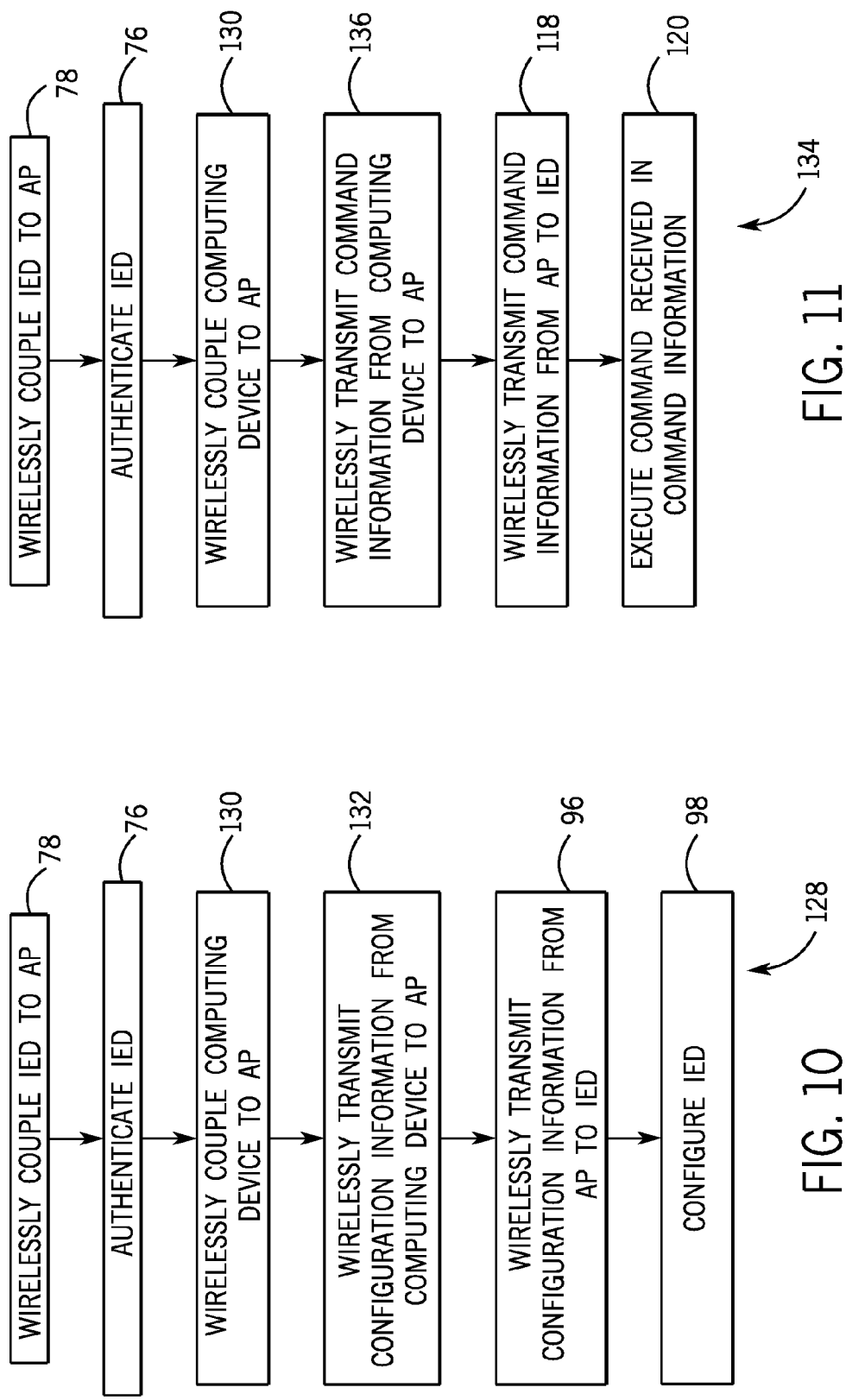

WIRELESS COMMUNICATION SYSTEMS AND METHODS FOR INTELLIGENT ELECTRONIC DEVICES

BACKGROUND

The subject matter disclosed herein relates to protection and control systems, and more specifically to communications within the protection and control systems.

Some systems, such as protection and control systems, industrial plants, or power distribution systems, may include intelligent electronic devices (IEDs). IEDs may be configured to provide metering, protection, and/or control functions within the systems. For example, an IED may receive data measurements from power equipment, such as a transformer, and transmit a status to a management device based on the received measurement. Accordingly, the IED may receive configuration signals to configure the IED, receive control signals to control the IED, and send data signals to communicate data to a management device. Because the protection and control systems may include high voltage equipment, it may be beneficial to enable operators to communicate with the IEDs at a distance in a secure manner.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a system including an intelligent electronic device (IED) comprising a first processor configured to communicate control commands to power equipment, receive measurements from the power equipment, and use a secure system to communicate with a management device, via the access point, to receive configuration information, command information, or any combination thereof, and to send data, in which the data includes the measurements.

A second embodiment provides a tangible, non-transitory, computer-readable medium storing instructions executable by a processor of an electronic device. The instructions are configured to send a control command to a power equipment and receive measurements for the power equipment, in which the measurements include current values, voltage values, frequency values, or any combination thereof. The instructions are further configured to use a secure system to communicate with a management device, via the access point, to receive configuration information, command information, or any combination thereof, and to send data, in which the data includes the measurements.

A third embodiment provides a system including an intelligent electronic device (IED) configured to couple directly to a computing device, in which the IED comprises a first processor configured to communicate control commands to a power equipment, receive measurements from the power equipment, send data directly to the computing device, wherein the data includes the measurements, and receive configuration information, command information, or any combination thereof directly from the computing device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a flow chart depicting an embodiment of a process for authenticating the intelligent electronic device in the embodiment depicted in FIG. 3;

FIG. 5 is a flow chart depicting an embodiment of a process for configuring the intelligent electronic device in the embodiment depicted in FIG. 3;

FIG. 8 is a flow chart depicting an embodiment of a process for executing a control command on the intelligent electronic device in the embodiment depicted in FIG. 3;

FIG. 9 is a block diagram of an embodiment of the protection and control system depicted in FIG. 2 with a remote authentication server and a computing device;

FIG. 10 is a flow chart depicting an embodiment of a process for configuring the intelligent electronic device in the embodiment depicted in FIG. 9;

FIG. 11 is a flow chart depicting an embodiment of a process for executing a control command on the intelligent electronic device in the embodiment depicted in FIG. 9;

DETAILED DESCRIPTION OF THE INVENTION

Figure 1:
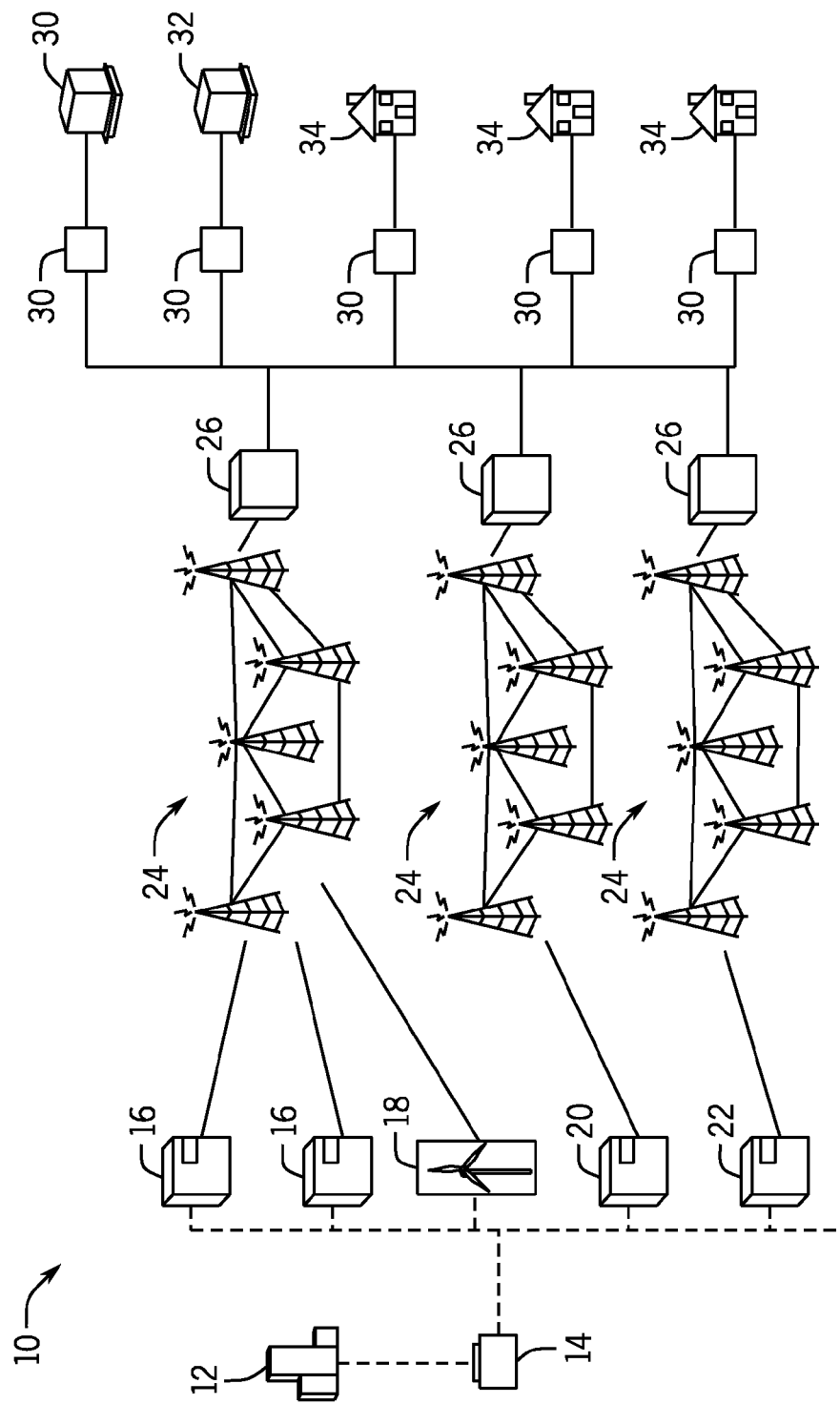
FIG. 1 is a block diagram of an embodiment of a generation, transmission, and distribution control system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards improving the communications with an intelligent electronic device (IED) disposed in a system, such as a protection and control system, an industrial plant, a power substation, or a distribution system. Within the system, IEDs may provide functions such as metering, protection, and/or control functions. For example, the IED may be coupled to power equipment, such as breakers, transformers, switches, motors, or generators, and configured to receive measurements from the power equipment. In addition, the IED may be configured to send control commands to the power equipment to control the functioning of the power equipment. Furthermore, based on the received measurements, the control commands may be protection control commands to the power equipment, such as to trip a breaker. Accordingly, the control system may be configured to enable an operator to send configuration information and/or command information to the IED and to receive data from IED. Because the control systems may include high voltage equipment, it may be beneficial to enable the operator to send information to and receive information from the IED at a distance and in a secure manner.

Accordingly, one embodiment of the present disclosure provides a system including an intelligent electronic device (IED) comprising a first processor configured to communicate control commands to power equipment, receive measurements from the power equipment, use a secure system to send data to an access point, in which the data includes the measurements, and use the secure system to communicate with a management device, via the access point, to receive configuration information, command information, or any combination thereof. In other words, the IED may be configured to securely communicate with an operator at a management device, for example, through a secure system. In one example, the secure system may include a wireless local area network (WLAN) using the Institute of Electrical and Electronics Engineers (IEEE) 802.11n standard, which enables an operator to communicate with the IED at various geographic distances with the desired cyber security protection for the communications. Furthermore, by using secure communications at any number of geographic locations, the techniques described herein may reduce the time needed for the operator to establish communications with the IEDs and may reduce the complexity caused by excessive wiring.

With the foregoing in mind, it may be useful to describe an embodiment of a system, such as a power grid system 10 including a power distribution system illustrated in FIG. 1. As depicted, the power grid system 10 may include one or more utilities 12. The utility 12 may provide for oversight operations of the power grid system 10. For example, a management device (e.g., utility control centers 14) may monitor and direct power produced by one or more power generation stations 16 and alternative power generation stations 18. The power generation stations 16 may include conventional power generation stations, such as power generation stations using gas, coal, biomass, and other carbonaceous products for fuel. The alternative power generation stations 18 may include power generation stations using solar power, wind power, hydroelectric power, geothermal power, and other alternative sources of power (e.g., renewable energy) to produce electricity. Other infrastructure components may include a water power producing plant 20 and geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through a power transmission grid 24. The power transmission grid 24 may cover a broad geographic region or regions, such as one or more municipalities, states, or countries. The transmission grid 24 may also be a single phase alternating current (AC) system, but most generally may be a three-phase AC current system. As depicted, the power transmission grid 24 may include a series of towers to support a series of overhead electrical conductors in various configurations. For example, extreme high voltage (EHV) conductors may be arranged in a three conductor bundle, having a conductor for each of three phases. The power transmission grid 24 may support nominal system voltages in the ranges of 110 kilovolts (kV) to 765 kilovolts (kV). In the depicted embodiment, the power transmission grid 24 may be electrically coupled to distribution systems (e.g., power distribution substation 26). The power distribution substation 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 230V, or 120V) distribution voltages. For example, industrial electric power consumers 30 (e.g., production plants) may use a primary distribution voltage of 13.8 kV, while power delivered to commercial consumers 32 and residential 34 consumers may be in the secondary distribution voltage range of 120V to 480V.

Figure 2:
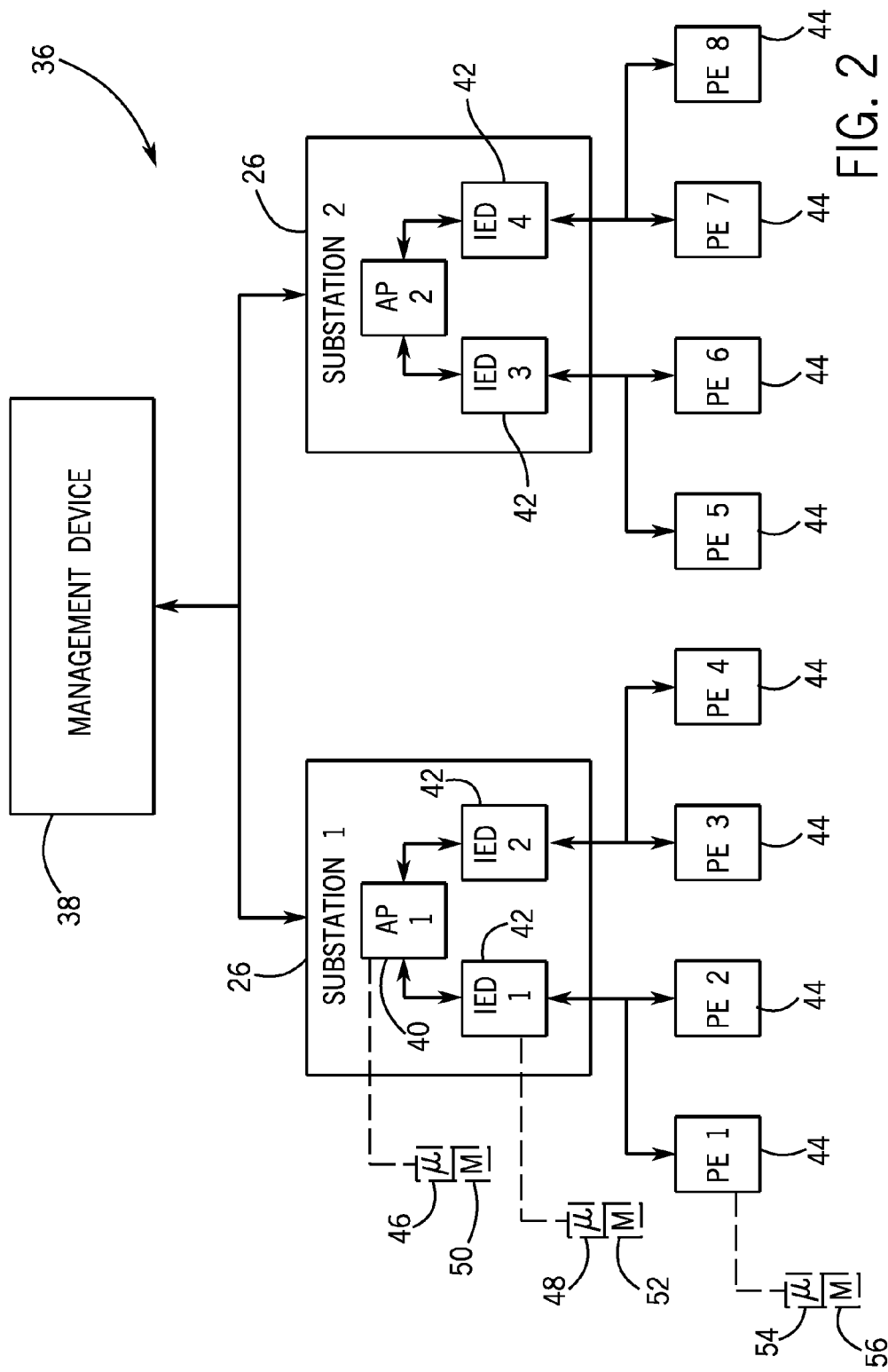
FIG. 2 is a block diagram of an embodiment of a protection and control system depicted in FIG. 1 with a management center and multiple substations each including multiple intelligent electronic devices.

As described above, the power distribution substation 26 may be part of the power grid system 10. Accordingly, the power transmission grid 24 and power distribution substation 26 may include various digital and automated technologies, such as intelligent electronic devices (IEDs), to communicate (i.e., send control commands and receive measurements) with power equipment such as transformers, motors, generators, switches, breakers, reclosers, or any component of the system 10. Accordingly, FIG. 2 depicts a general configuration of a protection and control system 36, which may be included in systems such as the power grid system 10, an industrial plant, or a power distribution system (i.e., power distribution substations 26). The system 36 is illustrated as including a management device 38, various substations 26, including access points 40 and IEDs 42, and various power equipment 44. As depicted, the management device 38 is communicatively coupled to multiple power distribution substations 26. As will be described in further detail below, the management device 38 may be communicatively coupled to the substations 26 in various ways. For example, the management device 38 may communicate with the substations 26 via a wide area network (WAN), a local area network (LAN), a personal area network (PAN), wireless networks, secure networks, and the like.

As depicted, the access point 40 is communicatively coupled to multiple IEDs 42, which facilitates communication between the access point 40 and the IEDs 42. For example, the access point 40 may be configured to relay configuration information and/or command information to the IED 42 from the management device 38. In some embodiments, the command information may instruct the IED 42 to read an actual value or a setting. In some embodiments, the command information may include a slave address, a function code, data associated with the function code, a cyclic redundancy check, a dead time, or any combination thereof. The configuration information may set certain parameters of the IED 42 relating to product setup, remote resources, grouped elements, control elements, inputs/outputs, transducer inputs/outputs, tests, and the like. In some embodiments, the configuration information includes a header node, a communication node, an intelligent electronic device node, a data type template node, or any combination thereof. In addition, the IED 42 may be configured to send data to the access point 40 and the access point 40 may be configured to concentrate the data received from the IED 42. In some embodiments, the data may include measurements received from the power equipment 44, such as sensor measurements (real-time, near real-time or delayed), measurement logs, a status, alarms, alerts, values computed by the equipment 44 such as statistics values, or any combination thereof. To facilitate these functions and the functions described below, the access point 40 and the IED 42 may include processors 46 and 48, respectively, useful in executing computer instructions, and may also include memory 50 and 52, useful in storing computer instructions and other data. In certain embodiments, the access point 40 may be a SCADA Gateway Communication Device, such as a D400, a D20MX, a D20, and the like, available from General Electric Company, of Schenectady, N.Y. Specifically, the SCADA Gateway Communication Devices may include the features of the access point 40. For example, the D400 concentrate data collected from the IEDs 42 installed in the substation 26 by polling and receiving information from connected IEDs 42 through a network, such as a LAN. In addition, the D400 may manipulate the data from devices to produce additional local/pseudo data points, present the data collected to a SCADA system, monitor power equipment 44 for alarm conditions, issue alarms, visually present data to an operator, and provide transparent access to IEDs 42 and/or power equipment 44. Additionally, the IED 42 may be a Universal Relay, such as a N60, a L90, a T60, a B90, a G60, and the like, available from General Electric Company, of Schenectady, N.Y. Accordingly, the Universal Relays may include the features of the IED 42. For example, the L90 is multi-functional and provides protection, control, and metering functions. Accordingly, Universal Relays may reduce cabling and auxiliaries significantly. In addition, the Universal Relays my transfer data to a central control facilities and/or human machine interfaces (HMI).

As described above, the IED 42 may be configured to perform metering, protection, and/or control functions. Accordingly, as depicted, the IEDs 42 are communicatively coupled to the power equipment 44, which may include transformers, motors, generators, switches, breakers, and/or reclosers. The IED 42 may perform metering functions by receiving measurements, such as current, voltage, and/or frequency, from the power equipment 44. As such, the power equipment 44 may derive and send the measurements to the IED 42. To facilitate deriving and sending measurements, the power equipment 44 may include a processor 54 useful in executing computer instructions, and a memory 56, useful in storing computer instructions and other data. In addition, based on received measurements, the IED 42 may derive measurement logs, determine a status of the power equipment 44, and/or determine certain values. For example, the IED 42 may determine a phase current, a phase voltage, a power, an energy, a demand (e.g., power demand), a frequency, and the like. Additionally, the IED 42 may determine the status of contact inputs, virtual inputs, remote inputs, remote double-point status inputs, teleprotection inputs, contact outputs, virtual outputs, remote devices, digital counters, selector switches, flex states, direct inputs, direct devices, direct integer input, teleprotection channel tests, Ethernet switch, and the like.

The IED 42 may perform control functions by sending control information to the power equipment 44 to instruct the power equipment 44 to take a desired action. In some instances, the desired action may include a protection function. For example, the IED 42 may instruct the power equipment 44, such as a circuit breaker, to trip if the power equipment 44 senses a measurement above a threshold and/or an anomaly in the measurements. These measurements may include current differential, directional phase overcurrent, directional neutral overcurrent, negative-sequence overcurrent, undervoltage, overvoltage, and distance protection.

Figure 3:
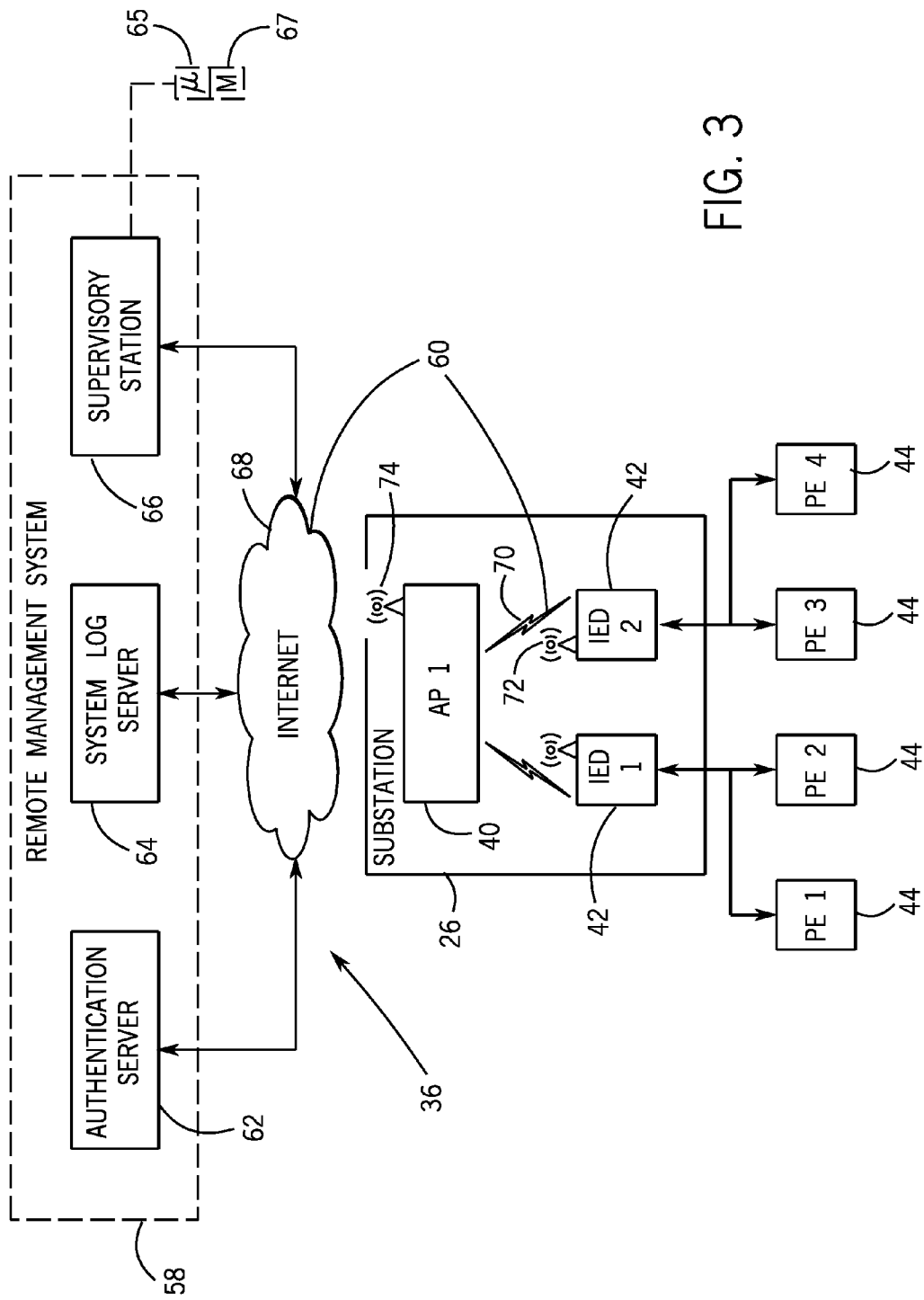
FIG. 3 a block diagram of an embodiment of the protection and control system depicted in FIG. 2 with a remote management system.

As described above, the system 36 may be implemented in various embodiments. One embodiment is depicted in FIG. 3. Specifically, the embodiment depicted in FIG. 3 utilizes a remote management system 58 as the management device 38 and communicatively couples the IED 42 with the access point 40 and the remote management system 58 via a secure system 60. The secure system 60 may include secure, encrypted communication conduits (e.g., wired and wireless), virtual private network (VPN) devices, firewalls, biometric authentication systems, token-based authentication systems (e.g., hardware tokens, software tokens), and the like. It should be appreciated that although only one substation 26 is depicted in the embodiment, the remote management system 58 may be configured to communicate with multiple substations 26.

As depicted, the remote management system 58 includes an authentication server 62, a system log server 64, and a supervisory station 66. The supervisory station 66 may enable a human operator to monitor and/or control the system 36. As such, the supervisory station 66 may include a processor 65 and memory 67 to facilitate the described control and/or monitoring functions of the supervisory station 66. Likewise, the servers 62 and 64 may also include a processor and a memory. One embodiment of the supervisory station 66 may include a supervisory control and data acquisition (SCADA). The authentication server 62 may facilitate secure communication within the control system 36. For example, the server 62 may provide for secure certificates, token authentication, biometric authentication, and the like, and use secure, encrypted communications conduits. In one embodiment, the authentication server 62 may be a Remote Authentication Dial In User Service (RADIUS) server. More details of the remote management system 58 are described below.

As described above, security for the operator and communications within the control system 36 is desired. It should be appreciated that a desired security for an operator may be provided by the remote management system 58 because the remote management device 58 may be located at a distance from the rest of the control system 36 and may use secure communications. Accordingly, as depicted, the remote management system 58 is communicatively coupled with the substation 26 through a wide area network (WAN) 68, such as the internet, and the IED 42 is communicatively coupled with the access point 40 through a local area network (LAN) 70. In some embodiments, the LAN 70 may be a wireless local area network (WLAN) network running any of the Institute of Electrical and Electronics Engineers (IEEE) 802.11 standards, such as IEEE 802.11n. Accordingly, the IED 42 and the access point 40 may include wireless adapters 72 and 74. It should be appreciated that in some embodiments the wireless adapters (i.e., 72 and 74) may be added onto a device (i.e., 42 or 44) to provide the wireless functionality. For example, wireless adapters (i.e., 72 and 74) may be added to a D400 SCADA gateway or to an N60 Universal Relay. Utilizing the techniques that will be described in further detail below, the secure system 60 may be configured to facilitate secure communications between the IED 42, the access point 40, and the remote management system 58. Specifically, this may include encryption, authentication (e.g., single party authentication, multi-party authentication), and other secure techniques useful in implementing communications within the control system 36. Accordingly, in some embodiments, the secure system 60 may include secure WAN 58, secure LAN 70, or any combination thereof. Furthermore, utilizing a secure wireless network may reduce the time needed for the operator to establish communications with the IED 42 and may reduce the complexity caused by undesired wiring.

One technique to provide the desired security for the control system 36 is through an authentication process 76, which reduces the possibility of undesired devices connecting to the control system 36 and enables the desired devices (i.e., IEDs 42) to connect to the control system 36. As depicted in FIG. 4, the process 76 may begin by wirelessly coupling the IED 42 to the access point 40 (process block 78). It is to be noted that the process 76 may be implemented by using executable computer instructions or code stored in memory and executed by the processors described herein (e.g., 46, 48, and 65). In some embodiments, block 78 may include the IED wireless adapter 72 coupling to the access point wireless adapter 74. Next, the IED 42 may wirelessly receive an identity request from the access point 40 (process block 80). In some embodiments, the identity request may be an extensible authentication protocol (EAP) identify request. EAP is a protocol that may be used during the authentication process 76, and may include EAP-MD5, EAP-PSK, EAP-TLS, EAP-TTLS, and/or EAP-IKEv2. After the IED 42 receives the request, the IED 42 may wirelessly send an identity response to the access point 40 (process block 82). In some embodiments, this may be EAP identify response, which includes information identifying the IED 42, such as a user name or log in credentials.

The IED 42 may then wirelessly receive an authentication method request from the access point 40 (process block 84). In some embodiments, this may be an EAP authentication method request. Specifically, the authentication method request may specify the authentication the IED 42 is to perform. After receiving the authentication method request, the IED 42 may wirelessly send an authentication method response to the access point 40 (process block 86). In some embodiments, this may be an EAP authentication method response. In the authentication method response, the IED 42 may agree to the authentication method requested by the access point 40 and begin using that method to authenticate itself. Alternatively, the IED 42 may disagree with the authentication method request and the IED 42 and the access point 40 may negotiate different authentication methods.

Once the authentication method is agreed upon, the IED 42 may wirelessly receive an authentication request (process block 88) and wirelessly send authentication requests (process block 90) to and from the access point 40 until the IED 42 receives a success message (process block 92). Similar to the steps described above, the authentication requests, the authentication responses, and the success message may be EAP authentication requests, EAP authentication responses, and an EAP success message.

The process 76 described details the wireless authentication communications between the IED 42 and the access point 40. However, it should be appreciated that, in some embodiments, the access point 40 is merely relaying communications to and from the authentication server 62. In other words, the authentication process 76 may alternatively be viewed as communications between the authentication server 62 and the IED 42. Accordingly, the authentication server 62 may enable central and remote authentication. Specifically, the authentication server 62 may authenticate multiple IEDs 42 in the remote location of the remote management system 58 and enable an operator to manage the secure system 60 from the authentication server 62. For example, on the authentication server 62, an operator may modify or revoke the ability for the IED 42 to connect to the control system 36.

As an added layer of security, the communications between the IED 42 and the access point 40 or the authentication server 62 may be encrypted to lessen the chance of observation and/or tampering. In some embodiments, this may include assigning a per use encryption key to the IED 42, such as a one-time key, each time the IED 42 attempts to connect. Accordingly, actual encryption key does not need to be given out. Other encryption methods may include a symmetric-key algorithm, a per-packet key, or any combination thereof.

In addition to implementing secure communications within the system 36, the embodiment depicted in the previous figures may provide additional benefits. For example, by facilitating configuration of the IEDs 42. An embodiment depicting a process 94 for configuring the IEDs 42 is depicted in FIG. 5. The process 94 may be implemented by using executable computer instructions or code stored in memory and executed by the processors described herein (e.g., 46, 48, 65). Similar to the authentication process 76, the configuration process 94 may begin by wirelessly coupling the IED 42 and the access point 40 (process block 78) and authenticating the IED 42 (process block 76). In other words, the first two depicted blocks may be included in the process block 76. After the IED 42 is authorized to communicate with the control system 36, the IED 42 may wirelessly receive configuration information from the access point 40 (process block 96). As described above, the configuration information may set parameters of the IED 42 relating to product setup, remote resources, grouped elements, control elements, inputs/outputs, transducer inputs/outputs, tests, and the like. In some embodiments, the configuration of the IED 42 (process block 98) may be done centrally and remotely at the remote management center 58. Specifically, this may include an operator at the remote management center 58 determining the configuration information and sending it through the access point 40 and wirelessly to the IED 42. Finally, based on the configuration information, the IED 42 may configure its settings (process block 98).

Figure 6:
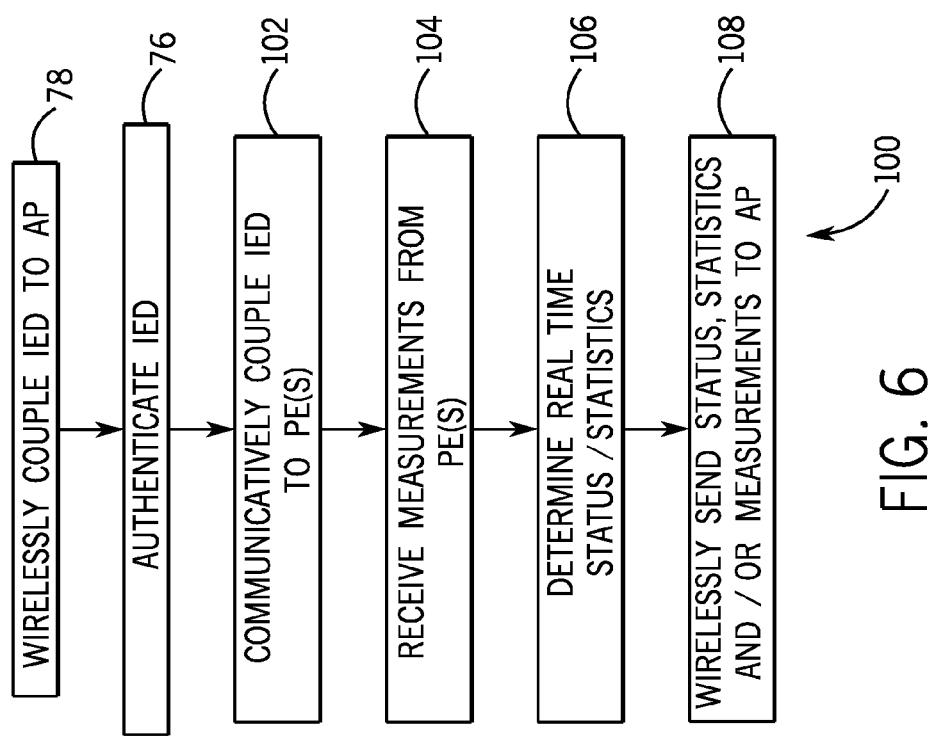
FIG. 6 is a flow chart depicting an embodiment of a process for sending data from the intelligent electronic device in the embodiment depicted in FIG. 3.

Furthermore, the systems depicted above in FIG. 3 may facilitate the metering functions of the IED 42 described previously. An embodiment of a metering process 100 is depicted in FIG. 6. The process 100 may be implemented by using executable computer instructions or code stored in memory and executed by the processors described herein (e.g., 46, 48, 65). Again, the metering process 100 may begin by wirelessly coupling the IED 42 and the access point 40 (process block 78), and then executing the remainder of blocks for authenticating the IED 42 (process block 76). Next, the IED 42 may be communicatively coupled to the power equipment 44, such as transformers or circuit breakers (process block 102). In some embodiments, this may include coupling the IED 42 to the power equipment 44 via a serial cable. It should be appreciated that process block 102 may be executed before process blocks 78 and 76. In other words, the IED 42 may be coupled to the power equipment 44 before being connected to the rest of the control system 36.

As described above, the power equipment 44 may derive certain measurements, such as current, voltage, and/or frequency. Accordingly, the IED 42 may receive the measurements from the power equipment 44 (process block 104). Based on the received measurements, the IED 42 may then determine a status and/or statistics (process block 106). As stated above, the IED 42 may determine certain values such as phase current, phase voltage, power, energy, demand, frequency, and the like; and the IED 42 may determine the status of contact inputs, virtual inputs, remote inputs, remote double-point status inputs, teleprotection inputs, contact outputs, virtual outputs, remote devices, digital counters, selector switches, flex states, Ethernet related values (e.g., connectivity, speed, lost packets), direct inputs, direct devices, direct integer input, teleprotection channel tests, Ethernet switch, and the like. The IED 42 may then wirelessly send the status, statistics, and/or measurements received from the power equipment 44 to the access point 40 (process block 108). Once the access point 40 receives the information from the IED 42, the access point 40 may perform additional functions such as, concentrate the information received from various IEDs 42, set off alarms, or enable viewing on a human-machine-interface (HMI) or any other graphical user interface (GUI). In some embodiments, the access point 40 may then send this information to the remote management system 58 to enable centralized and remote metering functions.

Figure 7:
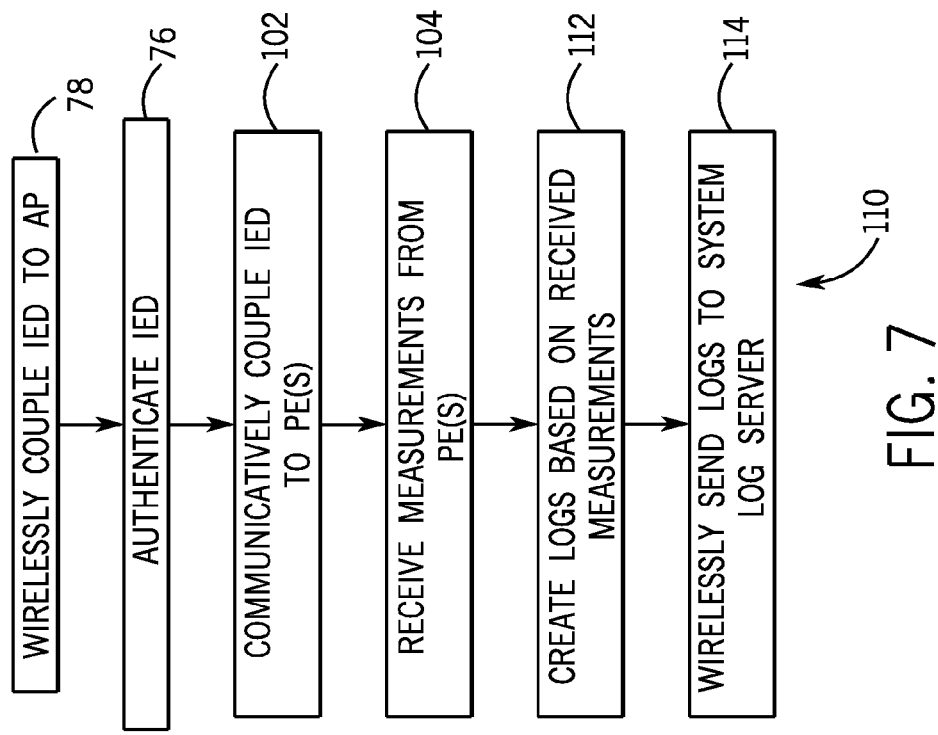
FIG. 7 is a flow chart depicting an embodiment of a process for retrieving measurement logs from the intelligent electronic device in the embodiment depicted in FIG. 3.

In addition to the metering function depicted in FIG. 6, another embodiment of a metering process is depicted in FIG. 7. Specifically, FIG. 7 depicts a metering process 110. As in the embodiment depicted in FIG. 7, the metering process 110 may being by wirelessly coupling the IED 42 and the access point 40 (process block 78), authenticating the IED 42 (process block 76), and communicatively coupling the IED 42 to the power equipment 44, such as transformers or circuit breakers (process block 102), and receiving measurements from the power equipment 44 (process block 104). Based on the received measurements, the IED 42 may then create logs (process block 112). In some embodiments, the logs may include the measurements received over time. Finally, the IED 42 may wirelessly send the logs to the System Log Server 64 (process block 114).

In addition to the metering function, the systems depicted in FIG. 3, may implement control/protection functions. One embodiment of a control/protection process 116 is depicted in FIG. 8. The process 116 may be implemented by using executable computer instructions or code stored in memory and executed by the processors described herein (e.g., 46, 48, 65). As in the metering processes 100 and 110, the control/protection process may begin by wirelessly coupling the IED 42 and the access point 40 (process block 78), authenticating the IED 42 (process block 76), and communicatively coupling the IED 42 to the power equipment 44, such as transformers or circuit breakers (process block 102). Again, the order of execution may be reversed, as described above with respect to the metering processes 100 and 110. Next, the IED 42 may wirelessly receive command information from the access point 40 (process block 118). As described above, the commands may include current differential, directional phase overcurrent, directional neutral overcurrent, negative-sequence overcurrent, undervoltage, overvoltage, and distance protection. Finally, the IED 42 may execute the instructions included in the command information (process block 120). In some embodiments, the command information may be determined at the remote management center 58, for example by an operator. The command information may then be sent through the access point 40 and wirelessly sent to the IED 42, which enables centralized and remote protection and/or control functions.

Another embodiment of the control system 36 depicted in FIG. 2 is depicted in FIG. 9. Specifically, the embodiment depicted in FIG. 9 includes a computing device 122 communicatively coupled to the substation 26. The computing device may be a computer, a server, a laptop, a tablet, a cell phone, a mobile device, or a similar processing or computing device. Accordingly, to facilitate the functioning of the computing device 122, the computing device 122 may include a processor 124 useful in executing computer instructions, and memory 126, useful in storing computer instructions and other data.

Similar to the embodiment depicted in FIG. 3, the authentication server 62 is communicatively coupled to the access point 40 via the WAN 68. Accordingly, the authentication 62 may function as described above in relation to FIG. 3. Specifically, the authentication server 62 may be configured to facilitate secure communication (e.g., by using the authentication process 92) within the system 36 via the secure system 60, which includes the WAN 68, the LAN 70, or any combination thereof. In addition, as depicted, the IED 42 is communicatively coupled to the access point 40 via the LAN 70. As in FIG. 3, in some embodiments, the LAN 70 may be a wireless network using one or more of the IEEE 80.11X protocols or other wireless protocols, which enables the access point 40 and the IED 42 to communicate wirelessly. Accordingly, the access point 40 and the IED 42 may include wireless access points 72 and 74. Also similar to the embodiment depicted in FIG. 3, the IED 42 is communicatively coupled to power equipment 44, which enables the IED 42 to receive measurements from the power equipment 44. Again, these communications may be encrypted by the IED 42 and/or the access point 40 for an added layer of security.

Differing from the embodiment depicted in FIG. 3, the control system 36 depicted in FIG. 9 utilizes the computing device 122 as the management device 38. Accordingly, the computing device 122 may be configured to perform many of the functions of the remote management system 58, and the computing device may include may include executable non-transitory computer instructions stored in a machine readable medium, such as the memory 126, to implement the functions described. For example, the computing device 122 may enable an operator to monitor and/or control the substation 26 via the computing device 122. In addition, as depicted, the computing device 122 is communicatively coupled to the access point 40 via the LAN 70. Similar to the IED 42, the computing device 122 may utilize a wireless network to connect to the access point 40. Accordingly, the computing device 122 may include a wireless adapter 127. It should be appreciated, that utilizing a wireless network to communicatively couple the computing device 122 and access point 40 may provide additional security to an operator by enabling the operator to monitor/control the substation 26 at a desired distance. In addition, the wireless network may facilitate implementing the desired cyber security for the communications within the control system 36. Furthermore, this may reduce the time needed for the operator to establish communications with the IED 42 and may reduce excessive wiring.

As described above, utilizing the computing device 122 as the management device 38 may enable an operator to remotely control the substation 26. For example, FIG. 10 depicts a process 128 for configuring the IED 42 via the computing device 122. The process 128 may be implemented by using executable computer instructions or code stored in memory and executed by the processors described herein (e.g., 46, 48, 65). Similar to configuration process 94 depicted in FIG. 5, the configuration process 128 may being by wirelessly coupling the IED 42 and the access point 40 (process block 78), and authenticating the IED (process block 76). Next the computing device 122 may be wirelessly coupled to the access point 40 (process block 130). This may include coupling the access point wireless adapter 74 and the computing device wireless adapter 127. It should be appreciated that process block 130 may be executed before process blocks 78 and 76. In other words, the computing device 122 may be coupled to the access point 40 before the IED 42 is coupled to the access point 40. Once the computing device 122 and the access point 40 are wirelessly coupled, the computing device 122 wirelessly transmits configuration information to the access point 40 (process block 132). In some embodiments, this may include an operator inputting configuration information into the computing device 122. As in FIG. 5, the access point 40 then wirelessly transmits the configuration information to the IED 42 (process block 96). After wirelessly receiving the configuration information from the access point 40, the IED 42 uses the configuration information to set the setting of the IED 42 accordingly (process block 98). As described above, the configuration information may of the IED 42 relate to product setup, remote resources, grouped elements, control elements, inputs/outputs, transducer inputs/outputs, tests, or the like. Accordingly, this may enable an operator to configure the IED 42 from a desired secure distance from the secure system 60.

In addition, the embodiment of the system 36 depicted in FIG. 9 may facilitate control functions within the substation 26. Similar to the control process 116 depicted in FIG. 8, FIG. 11 depicts a process 134 for controlling the IED 42. The process 134 may be implemented by using executable computer instructions or code stored in memory and executed by the processors described herein (e.g., 46, 48, 65). Again, the control process 126 may begin by wirelessly coupling the IED 42 and the access point 40 (process block 78), authenticating the IED 42 (process block 76), and wirelessly coupling the access point and the computing device (process block 130). Again, in some embodiments, the order of execution of the process blocks (i.e., 130, 76, and 78) may be altered. Next, the computing device 122 wirelessly transmits command information to the access point (process block 136). In some embodiments, the command information may be automatically sent to the device 122 or may be inputted by an operator on the computing device 122. Finally, as in FIG. 8, the access point 40 wirelessly transmits the command information to the IED 42 (process block 118) and the IED 42 executes commands received in the command information (process block 120). As described above, the commands may include current differential, directional phase overcurrent, directional neutral overcurrent, negative-sequence overcurrent, undervoltage, overvoltage, and distance protection. Accordingly, this enables an operator to control the IED 42 from a desired secure distance.

Figure 12:
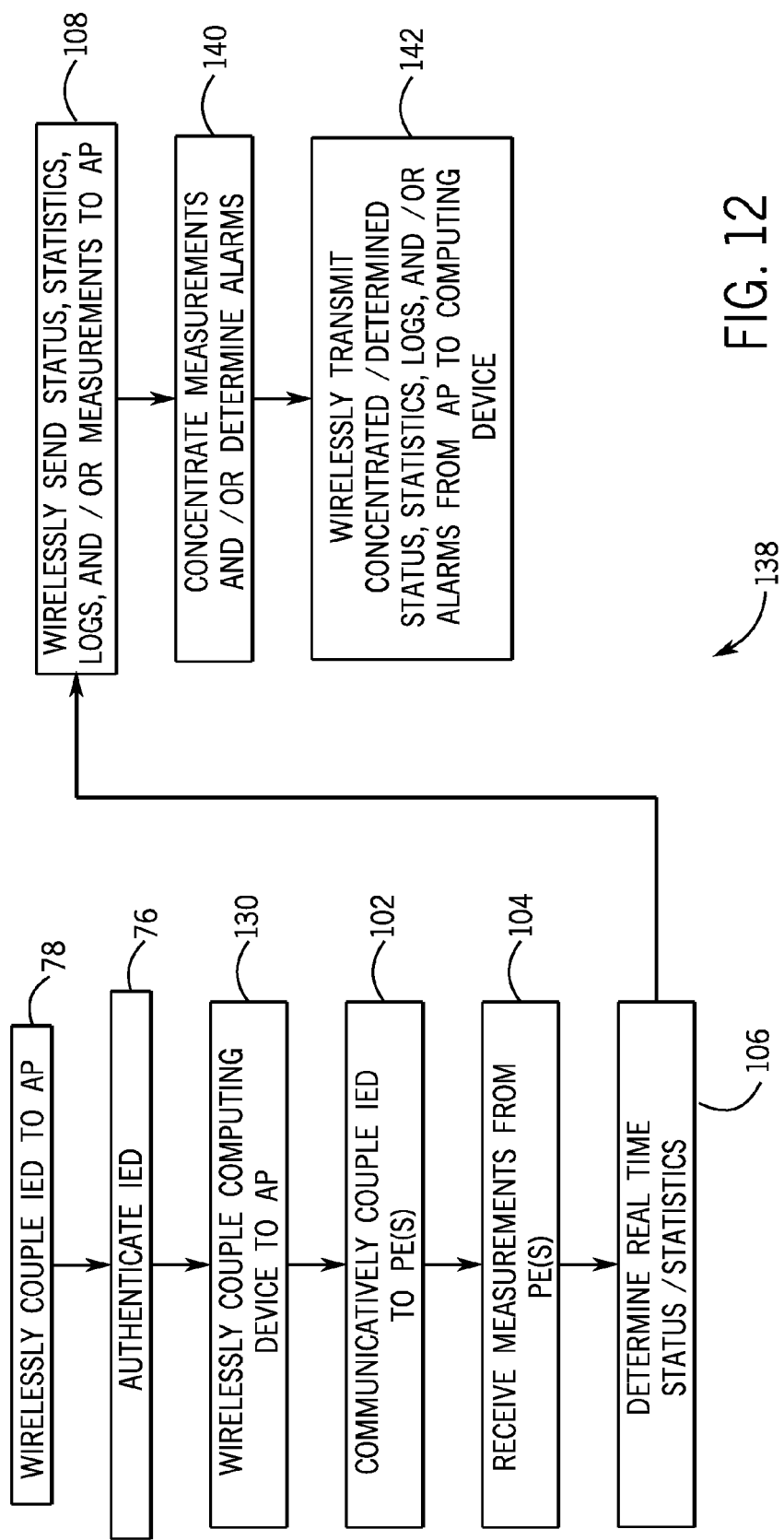
FIG. 12 is a flow chart depicting an embodiment of a process for transmitting data from the intelligent electronic device to the computing device in the embodiment depicted in FIG. 9.

In addition to the control functions, the system 36 embodiment depicted in FIG. 9 may provide a metering function. Specifically, FIG. 12 depicts a metering process 138. The process 138 may be implemented by using executable computer instructions or code stored in memory and executed by the processors described herein (e.g., 46, 48, 65). Again, the metering process 138 may begin by wirelessly coupling the IED 42 and the access point 40 (process block 78), authenticating the IED 42 (process block 76), and wirelessly coupling the access point and the computing device (process block 130). Again, in some embodiments, the order of execution of the process blocks (i.e., 130, 76, and 78) may be altered. Additionally, as in the metering process in FIGS. 4 and 5, the IED 42 is communicatively coupled to the power equipment 44 (process block 102), the IED 42 receives measurements from the power equipment 44 (process block 104), the IED 42 determines a status or other values based on the received measurements (process block 106), and the IED 42 wirelessly transmits the values, status, measurement logs, and/or received measurements to the access point (process block 108). As described above, the access point 40, based on the received data (e.g., measurements and statistics), may concentrate the measurements from multiple IEDs 42 and/or determine whether to set off an alarm and/or alert (process block 140). Finally, the access point 40 may wirelessly transmit the concentrated data, the status, statistics values, measurements logs, alarms, or any combination thereof to the computing device 122 (process block 142). Accordingly, this enables an operator to monitor the substation 26 at a desired secure distance via the computing device 122.

Figure 13:
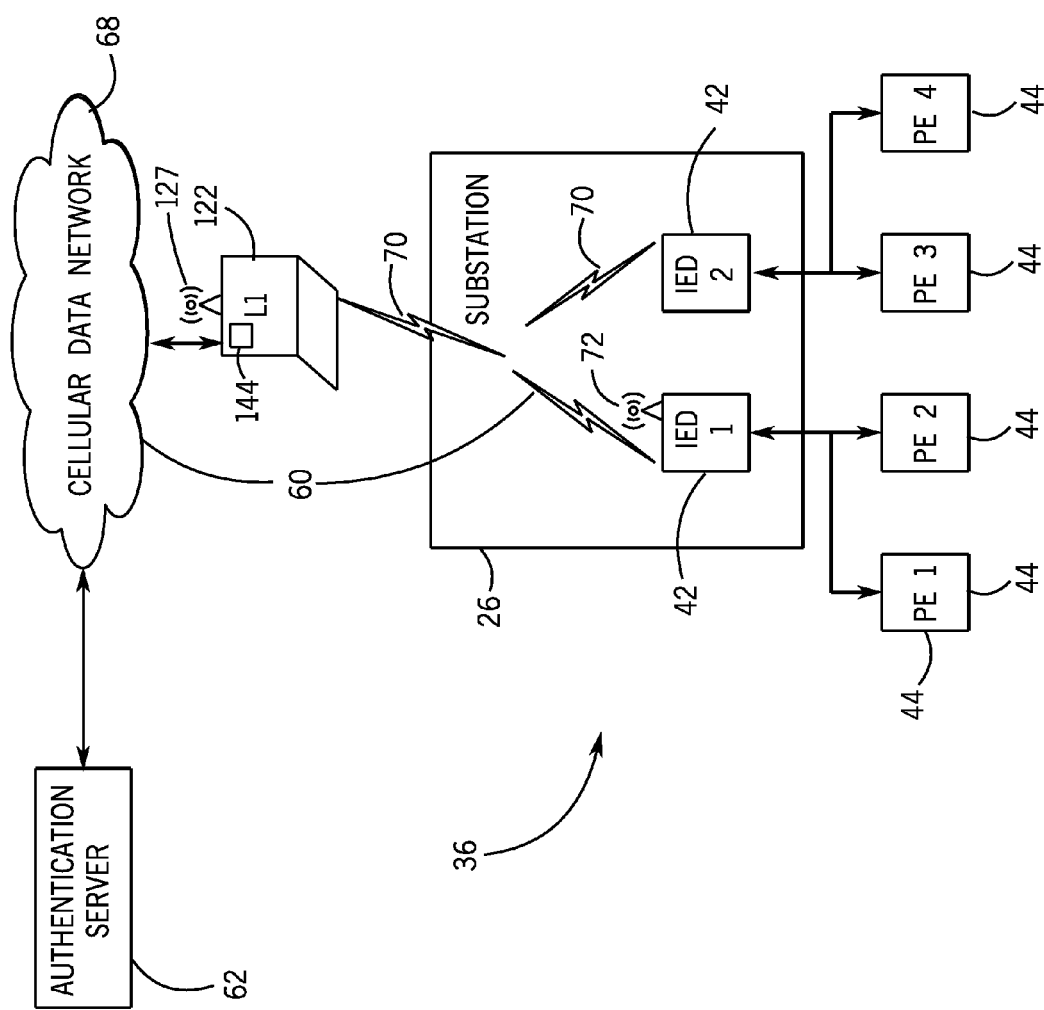
FIG. 13 is a block diagram of an embodiment of the protection and control system depicted in FIG. 2 in a local topology.
Figure 15:
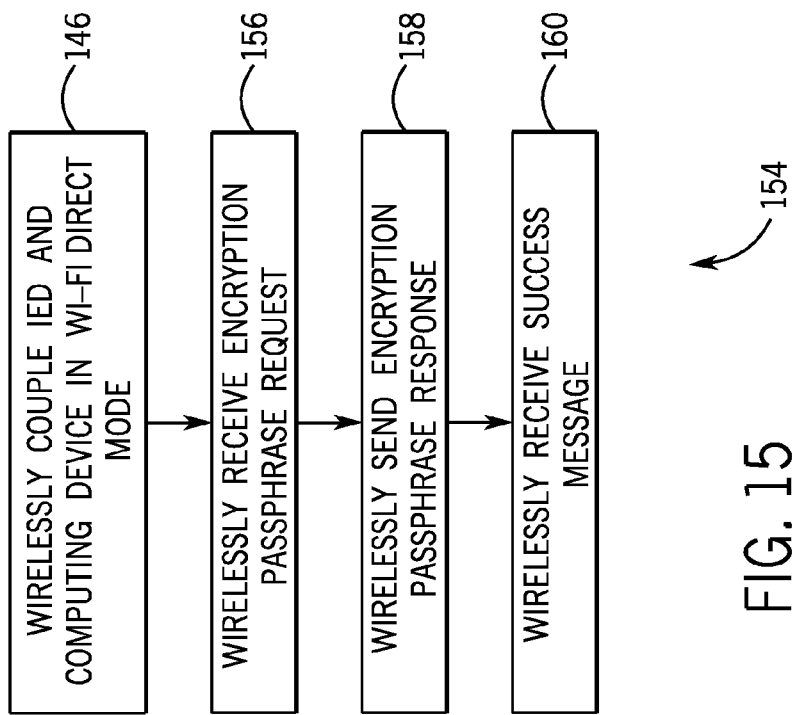
FIG. 15 is a flow chart depicting an embodiment of a process for authenticating the intelligent electronic device in the embodiment depicted in FIG. 13.

Another embodiment of the system 36 is depicted in FIG. 13. Specifically, the embodiment depicted in FIG. 13 may utilize the computing device 122 in lieu of the access point 40 and the management device 38. Accordingly, the computing device 122 may be configured to directly couple with the IEDs 42 to enable an ad-hoc LAN 70. In some embodiments, the computing device 122 may include instructions stored on a computer-readable medium, such as memory 126, that puts the computing device 122 in a Wi-Fi direct mode (e.g., ad hoc mode). For example, the computing device 122 may include a software access point 144. Accordingly, similar to the embodiments depicted in FIG. 3 and FIG. 9, the system 36 depicted in FIG. 13 may enable the IED 42 and the computing device 122 to wirelessly communicate over a wireless network running any of the IEEE 802.11X protocols and/or other wireless protocols. Furthermore, in some embodiments, the computing device 122 may include the authentication server 62 to provide the desired security for the secure system 60. Alternatively, the computing device wireless adapter 127 may be configured to communicatively couple with the remote authentication server 62 over WAN 68, such as a cellular network, which as described above, may enable centralized security in the control system 36. It should be appreciated that the embodiment depicted in FIG. 13 may be appropriate for smaller or local embodiments of the systems 36.

Figure 14:
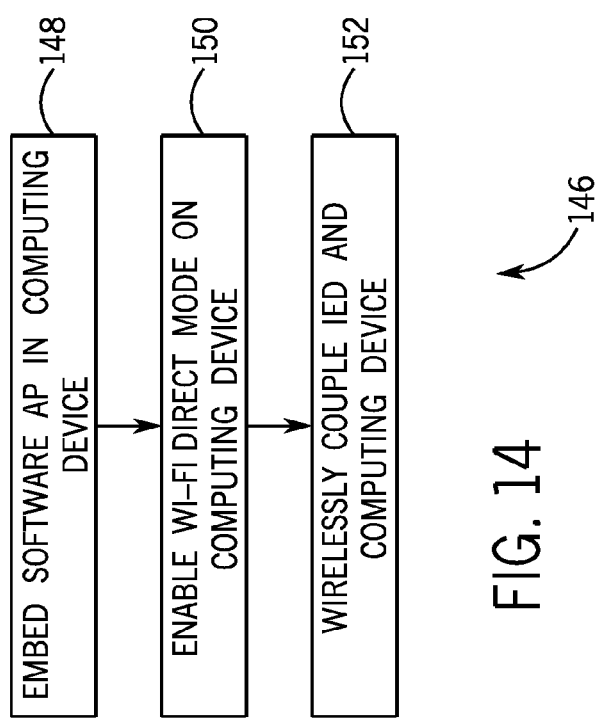
FIG. 14 is a flow chart depicting a process for coupling the intelligent electronic device and the computing device in the embodiment depicted in FIG. 13.

Specifically, a process 146 for wirelessly coupling the computing device 122 and the IED 42 is depicted in FIG. 14. The coupling process 146 may begin by embedding a software access point in the computing device 122 (process block 148). In some embodiments, this may include installing computer readable instructions, such as a computer program, into the computing device memory 126. The software access point may enable the computing device 122 to wirelessly couple with wireless devices (e.g., IED 42). Next, the Wi-Fi direct mode (e.g., ad hoc mode) may be enabled on the computing device (process block 150). Finally, the IED 42 and the computing device 122 are wirelessly coupled (process block 152). In some embodiments, this may include wirelessly coupling the IED 42 wireless adapter 72 and the computing device wireless adapter 127. Once the computing device 122 and the IED 42 are directly coupled, they may be enabled to directly communicate with one another.

Once the computing device 122 and the IED 42 are wirelessly coupled, as in the other embodiments, the IED 42 may be authenticated to ensure desired security of the control system 36. The authentication process may be similar to authentication process 76 described in FIG. 4. Specifically, the IED 42 may wirelessly communicate with the access point 40 embedded in the computing device 122. Furthermore, when the computing device 122 is communicatively coupled to the authentication server 62 over a WAN 68, such as a cellular network, the computing device may merely be relaying communication to and from the authentication server 62. In other words, the authentication process may be viewed as communications between the authentication server 62 and the IED 42. As in the embodiments described above, the use of the authentication server 62 may enable remote and centralized control of the control system security (i.e., communication over secure system 60).

Alternatively, a less extensive authentication process 154 may be utilized to authenticate the IED 42 useful with smaller topologies. The authentication process 154 may begin by wirelessly coupling the IED 42 and the computing device 122 in Wi-Fi direct mode (process block 146). Once wirelessly coupled, the IED 42 wirelessly received an encryption passphrase request (process block 156) and the IED 42 responds by wirelessly sending an encryption passphrase response to the computing device (process block 158). In some embodiments, the encryption passphrase may be an ASCII password shared to each of the IEDs 42. Finally, if the correct encryption passphrase is sent to the computing device 122, the IED 42 wirelessly receives a success message (process block 160), which enables the IED 42 to communicate with the rest of the control system 36. Again, in this embodiment, communications between the IED 42, the computing device 122 may be encrypted for an added layer of security.

Technical effects of the disclosed embodiments include improving operator security and communication security within the system 36. In particular, the management device 38 (e.g., computing device 122 or remote management system 58) may be located at a desired distance away from high voltage equipment to enable centralized and remote control and/or monitoring of the control system 36. In addition, the secure system 60 may provide the desired cyber security for the control system. Specifically, authentication processes (i.e., 76 and 160) may enable the system 36 to reduce the number of undesired device that connect while enabling desired device (i.e., IED 42) to connect. Furthermore, based on the embodiments described, the time needed for the operator to establish communications with the IEDs and the clutter caused by excessive wiring may be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an intelligent electronic device (IED) comprising a first processor configured to:
communicate control commands to power equipment,
receive measurements from the power equipment;
perform protection functions that include instructing the power equipment to take protective measures based on the measurements received;
use a secure system to communicate with a management device, via an access point, to securely and wirelessly receive configuration information, command information, or any combination thereof,
receive an encryption key from the secure system each time the IED connects to the management device; and
to securely and wirelessly send data from the IED to the access point, wherein the data includes the measurements.

2. The system of claim 1, wherein the first processor is further configured to:
perform metering functions, that include:
receiving the measurements from the power equipment;
creating measurement logs based on the measurements; and
determining a status and an operational value by using the measurements, wherein the measurements include current values, voltage values, frequency values, or any combination thereof; and
perform control functions, wherein the control functions include deriving a command and communicating the command to the power equipment.

3. The system of claim 1, wherein the secure system having an authentication server communicatively coupled to the access point, wherein the secure system is configured to:
use a wide area network (WAN) communicatively coupled to the authentication server and the access point; and
use a local area network communicatively coupled to the IED and the access point, wherein the authentication server comprises a second processor configured to authenticate the IED by sending authentication requests to the IED and receiving authentication responses from the IED via the secure system.

4. The system of claim 3, wherein the access point communicatively coupled to the IED, wherein the access point comprises a third processor configured to concentrate data, and the secure system is configured to wirelessly and securely couple the IED and the access point; wherein the data, the configuration information, the command information, the authentication responses, the authentication requests, or any combination thereof is wirelessly and securely transmitted between the IED and the access point.

5. The system of claim 4, wherein the first processor is configured to encrypt the data sent to the access point, and the third processor is configured to encrypt the configuration information, the command information, or any combination thereof.

6. The system of claim 1, further comprising a power grid system, a protection and control system, an industrial plant, a power distribution system, or any combination thereof, and wherein the power equipment is included in the power grid system, protection and control system, industrial plant, power distribution system, or the combination thereof.

7. The system of claim 1, wherein the management device communicatively coupled to the access point, wherein the management device is configured to centrally and/or remotely control and monitor the system, wherein the management device comprises a second processor configured to transmit the configuration information, the command information, or any combination thereof to the access point; wherein the command information includes a slave address, a function code, data associated with the function code, a cyclic redundancy check, a dead time, or any combination thereof, and the configuration information includes a header node, a communication node, an intelligent electronic device node, a data type template node, or any combination thereof.

8. The system of claim 1, comprising a system log server communicatively coupled to the access point, wherein the IED is configured to derive a measurement log based on the measurements and the system log server comprises a second processor configured to retrieve the measurement log.

9. A tangible, non-transitory, computer-readable medium storing instructions executable by a processor of an electronic device, the instructions configured to:
send a control command to a power equipment;
receive measurements for the power equipment, wherein the measurements include current values, voltage values, frequency values, or any combination thereof;
perform protection functions that include instructing the power equipment to take protective measures based on the measurements received;
use a secure system to communicate with a management device, via a access point, to securely and wirelessly receive configuration information, command information, or any combination thereof;
receive an encryption key each time the electronic device connects to the management device; and
to securely and wirelessly send data from the IED to the access point, wherein the data includes the measurements.

10. The computer-readable medium of claim 9, further comprising instructions configured to:
perform metering functions, wherein the metering functions include:
receiving the measurements from the power equipment;
creating measurement logs based on the measurements; and
determining a status and an operational value based on the measurements, wherein the measurements include current values, voltage values, frequency values, or any combination thereof; and
perform control functions, wherein the control functions include deriving a command and communicating the command to the power equipment.

11. The computer-readable medium of claim 9, further comprising instructions configured to: receive authentication requests from an authentication server via the access point; and send authentication requests to the authentication server via the access point.

12. The computer readable medium of claim 11, further comprising instructions configured to: wirelessly transmit the data, the authentication response, or any combination thereof, to the access point; and wirelessly receive the configuration information, the command information, the authentication request, or any combination thereof from the access point.

13. The computer readable medium of claim 9, further comprising instructions configured to: encrypt the data sent to the access point; and encrypt the configuration information, the command information, or any combination thereof.

14. The computer-readable medium of claim 13, further comprising instructions configured to: encrypt the data sent to the access point by using a symmetric-key algorithm, a per-packet key, or any combination thereof; and encrypt the configuration information, the command information, or any combination thereof using the symmetric-key algorithm, the per-packet key, or any combination thereof.

* * * * *